United States Patent [19]
Wada et al.

[11] Patent Number: 4,458,161
[45] Date of Patent: Jul. 3, 1984

[54] ELECTRET DEVICE
[75] Inventors: Hiroto Wada, Yokosuka; Shigeru Fuyiwara, Kawasaki, both of Japan
[73] Assignee: Tokyo Shibaura Denki Kabushiki Kaisha, Tokyo, Japan
[21] Appl. No.: 377,798
[22] Filed: May 13, 1982
[30] Foreign Application Priority Data
May 14, 1981 [JP] Japan ................................. 56-72620
[51] Int. Cl.³ ........................................... G11C 13/02
[52] U.S. Cl. ................................. 307/400; 179/111 E
[58] Field of Search .................... 307/400; 179/111 E; 29/592 E; 361/278, 288, 293

[56] References Cited
U.S. PATENT DOCUMENTS 3,588,640  6/1971  Fabricius ............................ 361/293
3,751,612  8/1973  Hansen ............................ 361/288 X
3,772,518 11/1973  Murayama et al. ............ 250/211 R

FOREIGN PATENT DOCUMENTS 2044180  3/1972  Fed. Rep. of Germany .
2216805 12/1972  Fed. Rep. of Germany .
2317424 10/1973  Fed. Rep. of Germany .
2539924  4/1976  Fed. Rep. of Germany .
1942841  6/1977  Fed. Rep. of Germany .
2538717  6/1979  Fed. Rep. of Germany .
2915165 11/1979  Fed. Rep. of Germany .
3041414  2/1982  Fed. Rep. of Germany .
3125776  5/1982  Fed. Rep. of Germany .
3125777  5/1982  Fed. Rep. of Germany .
3125784  5/1982  Fed. Rep. of Germany .
50-67998  6/1975  Japan .
1230402  5/1971  United Kingdom .
1398171  6/1975  United Kingdom .

OTHER PUBLICATIONS

"The Journal of the Acoustical Society of America", vol. 53, No. 6, pp. 1590-1600, Title: Electret Transducers; A Review, Author: G. M. Sessler and J. E. West.
"The Journal of the Acoustical Society of America", vol. 53, No. 6, 1973, pp. 1578-1588, Title: Introduction to Electrets, Author: H. J. Wintle.

Primary Examiner—George H. Miller, Jr.
Assistant Examiner—D. Jennings
Attorney, Agent, or Firm—Finnegan, Henderson, Farabow, Garrett & Dunner

[57] ABSTRACT

An electret device having improved uniformity and lifetime of surface charge distribution, wherein a polarized dielectric body is secured at its one flat surface to a conductive electrode and attached to a plurality of discrete cover bodies at its other flat surface opposite to the conductive electrode. The plurality of cover bodies may be comprised of any conductive, semi-conductive or non-conductive material.

10 Claims, 5 Drawing Figures

ELECTRET DEVICE

FIELD OF THE INVENTION

This invention relates to an electret device, more particularly, to an electret device having an extremely uniform and long-lived surface charge distribution.

BACKGROUND OF THE INVENTION

An electret is a dielectric body having a high degree of surface electric charge. The electret retains its surface electric charge for a long period of time, often measured in tens of years. The electric charge, or dielectric polarization, is achieved, for example, in one prior art process by heating a body of dielectric material to a relatively high temperature while the material is exposed to an intense electric field for a substantial period of time, and then cooling the material while maintaining its exposure to the electric field. Upon cooling, the material exhibits characteristics of a permanent charge distribution.

Electrets have many uses as a transducer in a device such as a microphone, a loudspeaker and a record disk pick-up. Moreover, it is anticipated that electrets will be used in the near future as memory units, high potential sources, measuring apparatus and the like.

Electrets comprise dielectrics which produce static electric fields having relatively long lifetimes. Their long lifetimes are primarily attributable to the development of new materials which are more stable than previously employed wax materials. Today, plastic materials such as polyethylene, polypropylene, and polyethylene terephthalate are extensively used in constructing electrets.

Conventionally, electrets are constructed in the form of electret devices in which an electret body is secured on a conductive electrode. Such electret devices have drawbacks, in that their surface charge distribution is less than uniform.

Other electret devices having improved uniformity of surface charge distribution are described in co-pending U.S. patent applications, Ser. Nos. 280,056, 280,052 and 280,016 each filed June 30, 1981, and each entitled "ELECTRET DEVICE," by Tanaka and Wada.

SUMMARY OF THE INVENTION

Accordingly, it is an object of the present invention to provide an electret device having an extremely uniform surface charge distribution.

Another object of the present invention is to provide an electret device having an expanded lifetime.

To achieve the foregoing objects in accordance with the invention, as embodied and broadly described herein, the electret device is comprised of a dielectric body provided with a surface electric charge, a conductive electrode secured on one surface of the dielectric body, and a plurality of cover bodies attached on the opposite surface of the dielectric body.

Further objects, features and advantages of the present invention will become apparent to persons skilled in the art from a study of the following description of the accompanying drawings, in which:

DESCRIPTION OF THE PREFERRED EMBODIMENT

Figure 1:
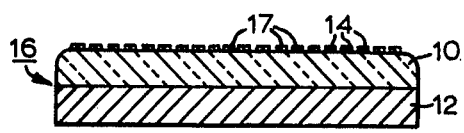
FIG. 1 is a sectional view of an electret device constructed according to the present invention.

The present invention will be described in detail with reference to the drawings (FIG. 1 to FIG. 5). Throughout the drawings, like reference numerals are used to designate like or equivalent portions, for the sake of clarity and simplicity of explanation.

FIG. 1 shows a sectional view of an electret device constructed according to the present invention. Dielectric body 10 is formed in a flat plate-like configuration with two substantially flat and generally parallel surfaces, and is provided with a volume of electric charge. Conductive electrode 12 is secured on one flat surface of dielectric body 10. A plurality of cover bodies 14, 14, ... are attached to the other flat surface of dielectric body 10, opposite conductive electrode 12. The combination of dielectric body 10 and conductive electrode 12 is similar to conventional electret devices.

Figure 2:
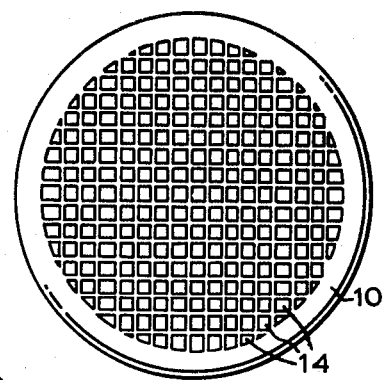
FIG. 2 is a top view of the electret device of FIG. 1.

Cover bodies 14, 14, ... are separated from each other as shown in FIG. 2. Accordingly, cover bodies 14, 14, ... are disposed on dielectric body 10 in the form of a mosaic.

Preferably, the spacing between individual cover bodies 14, 14, ... is as narrow as possible, so as to increase the combined total surface area occupied by the cover bodies 14, 14, .... However, the spacing must be sufficiently large to avoid a deleterious amount of charge coupling between individual cover bodies 14, 14 ..., which coupling causes drainage of the charge. In this regard, the minimum spacing which is tolerable will vary in accordance with the voltage of the polarized charge of dielectric body 10. Generally, the larger such voltage becomes, the greater the spacing required between individual cover bodies 14, 14, ... in order to avoid charge coupling.

For an electret device constructed according to the present invention and having a dielectric body 10 which has a polarized charge of about 400 to 500 volts, the spacing between individual cover bodies 14, 14, ... is preferably about 0.1 mm. However, a spacing of as little as 0.05 mm is within the contemplation of the present invention.

Preferably, cover bodies 14, 14, ... are as thin as possible. This results from the fact that the impedance of a transducer including an electret device of the present invention is directly proportional to the thickness of the cover bodies, and a high impedance value will deleteriously affect the transducing efficiency of the transducer. For an electret device constructed according to the present invention and having a conductive electrode 12 which is 400 microns in thickness, and a dielectric body 10 which is 100 microns in thickness, cover bodies 14, 14, ... are preferably within the range of from about 0.001 to about 0.01 mm in thickness.

Typically, polarization of dielectric body 10 is carried out by, for example, imposing an electrical field or applying charged particles, e.g., ions, before or after conductive electrode 12 is secured to dielectric body 10. The polarity of dielectric body 10 may be determined by the polarity of the electrical field or the charged particles.

Most dielectric materials are suitable for forming dielectric body 10 in the electret of the present invention. However, high molecular weight compounds, such as polypropylene, fluorine-containing polymers, e.g. teflon®, or polyethylene, are especially suitable because the electric charge in these materials becomes relatively high in potential and is maintained for a long period of time.

Cover bodies 14, 14 . . . may be formed from a material selected from any conductive, semi-conductive or non-conductive material, or mixtures thereof, and/or mixed with other substances. For example, non-conductive materials, such as glass or organic compounds, having a volume resistivity of more than $10^{12} \Omega$-cm are particularly suitable.

Metallic cover bodies 14, 14 . . . may be formed on dielectric body 10 by means of various conventional methods, for example, adhesive bonding, thermocompression bonding or plating, either as continuous body or isolated bodies. In the case of cover bodies 14, 14, . . . formed initially as a continuous body, the continuous body is divided into plural bodies by etching or carving.

The polarization of dielectric body 10 must be carried out before cover bodies 14, 14, . . . are attached to dielectric body 10 if the cover bodies 14, 14, . . . are made of non-conductive or dielectric material.

In the electret device 16 described above, cover bodies 14, 14, . . . are polarized dielectrically under the effect of charged dielectric body 10. A positive polarity appears on cover bodies 14, 14, . . . at their outer surfaces 17, 17, . . . if the polarity of the surface charge of dielectric body 10 adjacent cover bodies 14, 14, . . . is positive, and vice versa. That is, a polarity which is the same as the polarity of the surface charge of dielectric body 10 appears on each of the outer surfaces 17, 17, . . . of cover bodies 14, 14, . . . .

Figure 3:
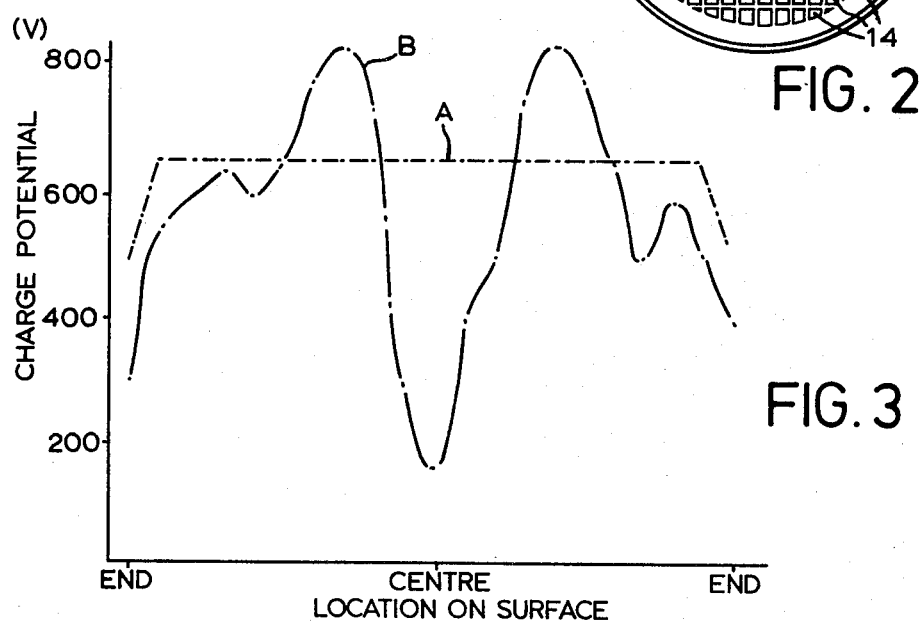
FIG. 3 is a diagram comparing charge potential distributions on a conventional electret device and an electret device according to the present invention.

FIG. 3 shows a diagram comparatively illustrating the potential distribution characteristics of electret device 16 constructed according to the present invention and a conventional electret device. Graph A shows the potential distribution characteristics of an electret device 16 constructed according to the present invention, and graph B shows the potential distribution characteristics of a conventional electret device similar in size to that of the present invention. As may be seen from the almost flat characteristics of graph A, electret device 16 constructed according to the present invention exhibits an exceedingly uniform surface charge at every outer surface 17 of cover body 14. On the other hand, the conventional electret device does not exhibit a uniform surface charge, as may be seen from graph B.

Electret device 16 of the present invention is, therefore, very useful, due to its improved uniformity of surface charge distribution. That is, for example, transducers using electret device 16 of the present invention can provide improved highfidelity transducing characteristics, since the electrostatic forces arising between electret device 16, as one electrode of a transducing capacitor, and an opposing electrode are uniform at every part of the transducing capacitor.

Furthermore, electret device 16 constructed according to the present invention exhibits exceedingly long-lived charge or polarization retention properties, since the distance between outer surfaces 17, 17, . . . of cover bodies 14, 14, . . . and conductive body 12 along the surface of electret device 16 itself are lengthened by means of the isolation of cover bodies 14, 14, . . . from each other. Therefore, the polarized charges on outer surfaces 17, 17, . . . of cover bodies 14, 14, . . . are hard to drain into conductive body 12.

Figure 4:
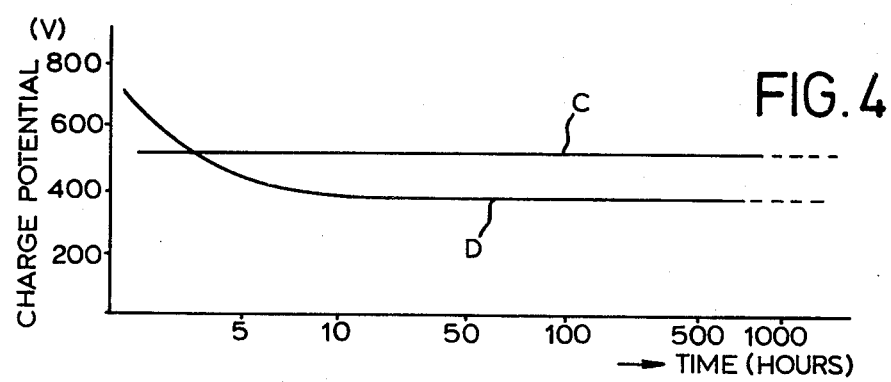
FIG. 4 is a diagram illustrating the charge retention properties of two embodiments of the electret device constructed in accordance with the present invention.

The charge retention properties of electret device 16 of the present invention are shown in FIG. 4. Graph C shows the properties of electret device 16 having cover bodies 14, 14, . . . which are comprised of a conductive material, e.g., a metal. On the other hand, graph D shows the properties of an electret device 16 whose cover bodies 14, 14, . . . are comprised of a non-conductive material, for example, acrylonitrile-butadien-styrene (ABS) copolymer. The charge potential shown in graph C is maintained for a long period of time at almost the same value as at the time of its fabrication, while the charge potential shown in graph D gradually decreases after the time of its fabrication and approaches a steady state condition around 24 hours afterwards. Then, both of the charge potentials (C and D) remain at a steady state for a very long period of time.

Furthermore, the surface charge of an electret device 16 having cover bodies 14, 14, . . . made of a conductive material may be easily increased when it diminishes by merely supplying a high voltage potential between conductive electrode 12 and conductive cover bodies 14, 14, . . . , since dielectric body 10 will be repolarized by the high voltage potential.

Figure 5:
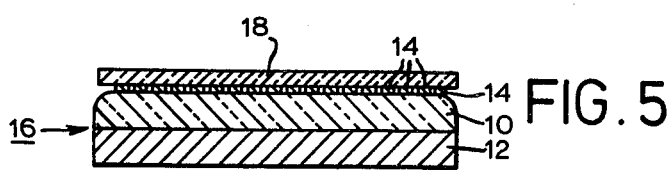
FIG. 5 is a sectional view of a further embodiment of the present invention.

FIG. 5 shows a sectional view of a further embodiment of an electret device according to the present invention. Electret device 16a of FIG. 5 is different from that of FIG. 1, by virtue of the fact that electret device 16a of FIG. 5 is further comprised of a second cover body 18 on the top of metallic cover bodies 14, 14, . . . . Second cover body 18 is comprised of a non-conductive material or semi-conductive material, e.g., inorganic or organic substances, and prevents the drainage of charge from metallic cover bodies 14, 14, . . . .

What is claimed is:

1. An electret device comprising:
    a dielectric body provided with a surface electric charge and adapted to retain said charge when the electret device is not in operation, said body having two substantially flat and generally parallel surfaces;
    a conductive electrode having a substantially flat surface which is rigidly secured on one of said flat surfaces of the dielectric body, said conductive electrode forming an integral part of the electret device; and
    a plurality of cover bodies rigidly attached on the opposite one of said flat surfaces of the dielectric body, said plurality of cover bodies being laterally spaced apart and being electrically isolated from each other during operation of the device, and said cover bodies forming an integral part of the electret device, whereby the electret device possesses a substantially uniform surface charge distribution.

2. An electret device according to claim 1, wherein said plurality of cover bodies are comprised of a conductive material.

3. An electret device according to claim 2 further comprising a non-conductive cover attached on the top of said plurality of conductive cover bodies.

4. An electret device comprising:
    a dielectric body provided with a surface electric charge and having two substantially flat and generally parallel surfaces;

a conductive electrode having a substantially flat surface which is rigidly secured on one of said flat surfaces of the dielectric body, said conductive electrode forming an integral part of the electret device; and a plurality of cover bodies rigidly attached on the opposite one of said flat surfaces of the dielectric body, said plurality of cover bodies being laterally spaced apart from each other and being comprised of a non-conductive material.

5. An electret device according to claim 4, wherein said plurality of non-conductive cover bodies are formed from an organic substance.

6. An electret device according to claim 4, wherein said plurality of non-conductive cover bodies are formed from an inorganic substance.

7. An electret device comprising:

a dielectric body provided with a surface electric charge and having two substantially flat and generally parallel surfaces; a conductive electrode having a substantially flat surface which is rigidly secured on one of said flat surfaces of the dielectric body, said conductive electrode forming an integral part of the electret device; and a plurality of cover bodies rigidly attached on the opposite one of said flat surfaces of the dielectric body, said plurality of cover bodies being laterally spaced apart from each other and being comprised of a semi-conductive material.

8. An electret device comprising:

a dielectric body provided with a surface electric charge and having two substantially flat and generally parallel surfaces;

a conductive electrode having a substantially flat surface which is rigidly secured on one of said flat surfaces of the dielectric body, said conductive electrode forming an integral part of the electret device;

a plurality of cover bodies rigidly attached on the opposite one of said flat surfaces of the dielectric body, said plurality of cover bodies being laterally spaced apart from each other and being comprised of a conductive material; and a semi-conductive cover attached on the top of said plurality of conductive cover bodies.

9. An electret device comprising:

a dielectric body provided with a surface electric charge and having two substantially flat and generally parallel surfaces;

a conductive electrode having a substantially flat surface which is rigidly secured on one of said flat surfaces of the dielectric body, said conductive electrode forming an integral part of the electret device;

a plurality of cover bodies rigidly attached on the opposite one of said flat surfaces of the dielectric body, said plurality of cover bodies being laterally spaced apart from each other and being comprised of a conductive material; and a non-conductive cover attached on the top of said plurality of conductive cover bodies, said non-conductive cover being formed from an inorganic substance.

10. An electret device comprising:

a dielectric body provided with a surface electric charge and having two substantially flat and generally parallel surfaces;

a conductive electrode having a substantially flat surface which is rigidly secured on one of said flat surfaces of the dielectric body, said conductive electrode forming an integral part of the electret device;

a plurality of cover bodies rigidly attached on the opposite one of said flat surfaces of the dielectric body, said plurality of cover bodies being laterally spaced apart from each other and being comprised of a conductive material; and a non-conductive cover attached on the top of said plurality of conductive cover bodies, said non-conductive cover being formed from an organic substance.

* * * * *